Jan. 21, 1930.　　　W. A. FOSS　　　1,744,461

FISHING REEL

Filed Dec. 10, 1923

Inventor
William A. Foss
By Fra Gerlach Atty.

Patented Jan. 21, 1930

1,744,461

UNITED STATES PATENT OFFICE

WILLIAM A. FOSS, OF CLEVELAND, OHIO, ASSIGNOR TO THE AMERICAN FORK & HOE COMPANY, OF CLEVELAND, OHIO, A CORPORATION OF OHIO

FISHING REEL

Application filed December 10, 1923. Serial No. 679,547.

The invention relates to fishing reels and its object is to prevent the line from becoming entangled or overrunning while casting. In practice, it has been a desideratum to provide a fishing reel in which automatic provision is made for this purpose without acting as sufficient drag upon the line or spool to substantially lessen the distance of the cast, and this object is attained in the present invention by providing an inertia governor or weight which is rotatable by, and independently of, the spool, so that it will prevent overrunning and the consequent tangling of the line in casting the bait and which is disposed adjacent one end of the spool where it may be conveniently applied to the reel. Other objects of the invention will appear from the detailed description.

The invention consists in the several novel features hereinafter set forth and more particularly defined by claims at the conclusion hereof.

Figure 1:
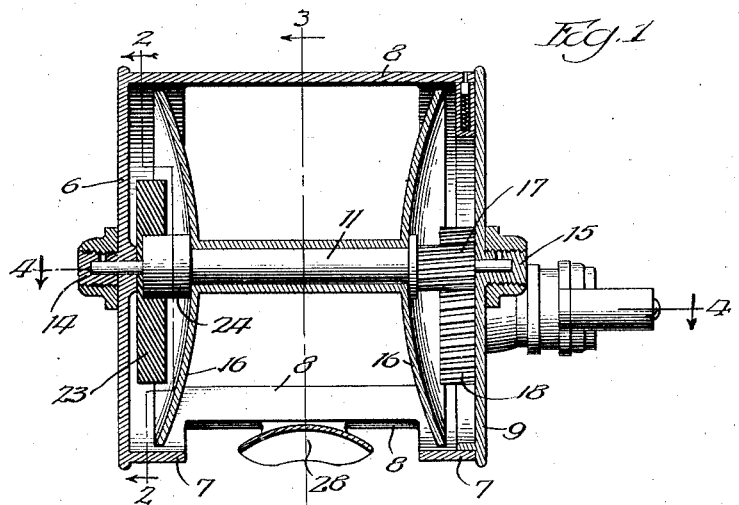
Figure 2:
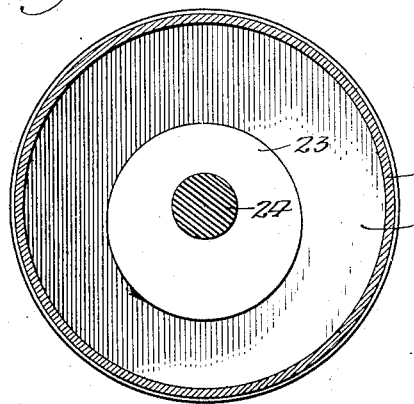
Figure 3:
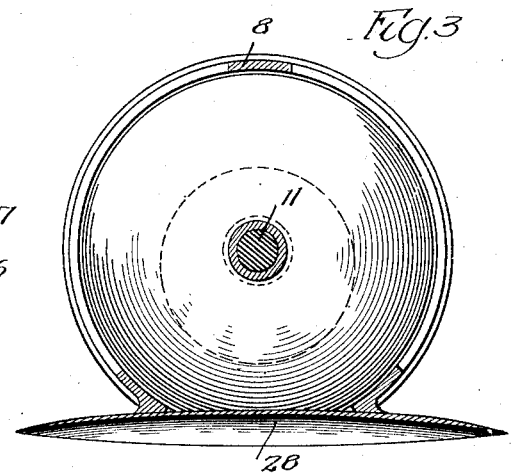
Figure 4:
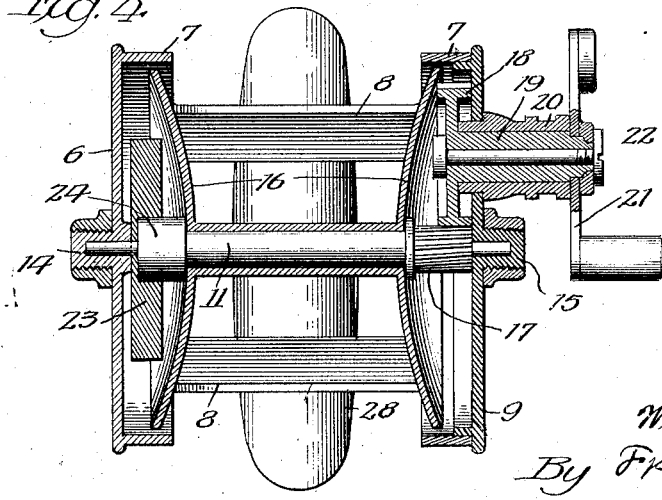
Figure 5:
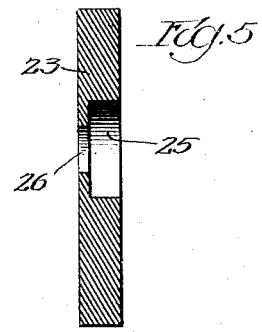

In the drawings: Fig. 1 is a transverse axial section of a fishing reel embodying the invention. Fig. 2 is a section on line 2—2 of Fig. 1. Fig. 3 is a section on line 3—3 of Fig. 1. Fig. 4 is a section on line 4—4 of Fig. 1. Fig. 5 is a section of the governor-weight on an enlarged scale.

The invention is exemplified in a fishing reel comprising a frame consisting of a side plate 6 with integral rims 7 and cross-bars 8 and a removable side suitably locked to the frame. A spool, on which the line is wound, comprises a shaft 11 having its terminals journalled in bearings 14 and 15 in framesides 6 and 9 respectively and flanges or sides 16 which are rigid with the shaft. The gearing for rotating the spool to wind up the line comprises a pinion 17 rigid with shaft 11, a gear-wheel 18 meshing with the pinion and integral with a hollow shaft 19 which is journalled in frameside 9 and a balanced crank 21 which is rigidly secured to shaft 19 by a screw 22. The frame is provided with a curved plate 28, whereby the reel may be secured to the fishing rod by the usual slidable retaining band thereon. The frame, spool and gearing may be of any suitable construction, as well understood in the art.

Shaft 11, adjacent the outer side of one of the disks 16 is provided with a hub having a cylindrically peripheral face 24. A governor weight 23 in the form of a disk is provided with a cylindrical bearing 25 adapted to fit loosely around the peripheral face 24 and with a reduced opening 26 which is adapted to extend between the hub 24 and frameside 6 to position the governor-weight longitudinally of the shaft.

In casting the rotation of the spool will rotate the hub-face 24 which will frictionally engage the bearing 25 of the governor 23 which is rotatable relatively to the spool and frictionally rotatable by said hub so that the weight will act as an inertia governor in retarding the line in casting. A characteristic of this device is that during the initial portion of the cast the shock of the bait will tend to rotate the reel relatively to the weight but thereafter the weight will gradually be picked up by the spool and lessen its retarding effect thereon so that the retardation will be the minimum required to prevent the line from overrunning during the cast. When the cast has been completed and the bait strikes the water, the fisherman will press his thumb on the reel to stop it, and when this is done, the weight is free to rotate independently of the spool, so that it will not subject the latter to a sudden shock at such time.

In practice, it has been found that an unbalanced rotatable weight sets up a vibration in the spool which tends to loosen the outgoing strand of line from the contiguous convolutions on the spool, and for this purpose, the bearing 25 is eccentrically disposed in the disk. Because of the eccentricity of the bearing, the disk will be unbalanced and will consequently set up this desired vibration.

The invention exemplifies a fishing reel in which an inertia governor is disposed adjacent one of the sides of the spool; also a reel in which a weight-governor, rotatably by and relatively to the spool, is disposed between the spool side and the frame-side and in which provision is made for vibrating the spool during the cast.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing reel, the combination of a frame adapted to be secured to a fishing rod, a spool rotatably mounted in the frame, comprising side flanges and a cylindrical member adjacent the outer side of one of the flanges, said member being coaxial with the spool and fixed to rotate therewith, means for operating the spool to wind a line thereon, and a rotatable unbalanced weight loosely mounted on and frictionally engaging said member to retard and vibrate the spool in casting the line.

2. In a fishing reel, the combination of a frame adapted to be secured to a fishing rod, a spool rotatably mounted in the frame, comprising a shaft, means for operating the spool to wind a line thereon, and an annular weight eccentrically and loosely mounted on and frictionally engaging a portion of the shaft to retard and vibrate the spool in casting the line.

3. In a fishing reel, the combination of a frame adapted to be secured to a fishing rod, a spool rotatably mounted in the frame, means for operating the spool to wind a line thereon, a hub with a cylindrical face rotatable with the spool, and a disk eccentrically and loosely mounted around and frictionally engaging said face on the hub to retard and vibrate the spool in casting the line.

Signed at Cleveland, Ohio, this 26th day of November, 1923.

WILLIAM A. FOSS.